Sept. 11, 1956        B. D. KUMPFER        2,762,980

STANDING WAVE DETECTOR FOR MILLIMETER WAVES

Filed April 14, 1953

INVENTOR.
BEVERLY D. KUMPFER

BY Harry M. Saragovitz

ATTORNEY

United States Patent Office 2,762,980
Patented Sept. 11, 1956

2,762,980

STANDING WAVE DETECTOR FOR MILLIMETER WAVES

Beverly D. Kumpfer, Spring Lake Heights, N. J., assignor to the United States of America as represented by the Secretary of the Army Application April 14, 1953, Serial No. 348,841

3 Claims. (Cl. 333—6)

(Granted under Title 35, U. S. Code (1952), sec. 266)

The invention described herein may be manufactured and used by or for the Government for governmental purposes, without the payment of any royalty thereon.

This invention relates to millimeter wave transmission circuits and more particularly to a standing wave detector for millimeter waves which are transmitted through a waveguide or other enclosed transmission line.

Conventional standing wave detectors usually consist of a transmission line or waveguide having a longitudinal slot and a probe which may be inserted through the slot and moved throughout the length of the waveguide or any portion thereof. The ratio of the maximum voltage to the minimum voltage derived from the probe is known as the standing wave ratio. However, for millimeter wavelengths, especially below 5 mm., the size of the waveguide is so small that it becomes impractical to machine a probing slot in one side, since even the narrowest slot removes a large portion of the boundary and causes excessive leakage. The mechanical problems associated with keeping a probe at constant depth and the reflections caused by the probe are also prohibitive when operating at millimeter wavelengths.

It is therefore an object of the present invention to provide an improved standing wave detector especially adaptable for millimeter waves.

It is yet another object of the present invention to provide a simple standing wave detector for millimeter waves wherein the problems of mechanical alignment and the depth of probe penetration are reduced to a minimum.

In accordance with the invention, a standing wave detector for the field within a waveguide adapted to propagate radio energy of millimeter wavelengths comprises a solid dielectric section within the waveguide having at least one surface exposed and so dimensioned that the field propagated therein has the same configuration as the field propagated within the waveguide. Means are provided for matching the dielectric section to the waveguide. Also included is a wave detector probe and means for positioning said probe along the exposed surface of the dielectric section to derive at said probe voltage maxima and minima in the waveguide.

Figure 1:
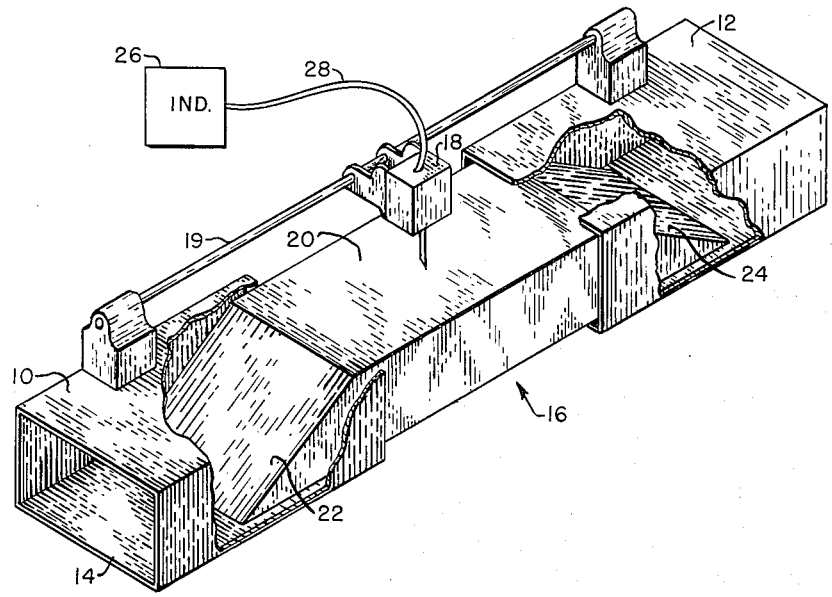
Figure 2:
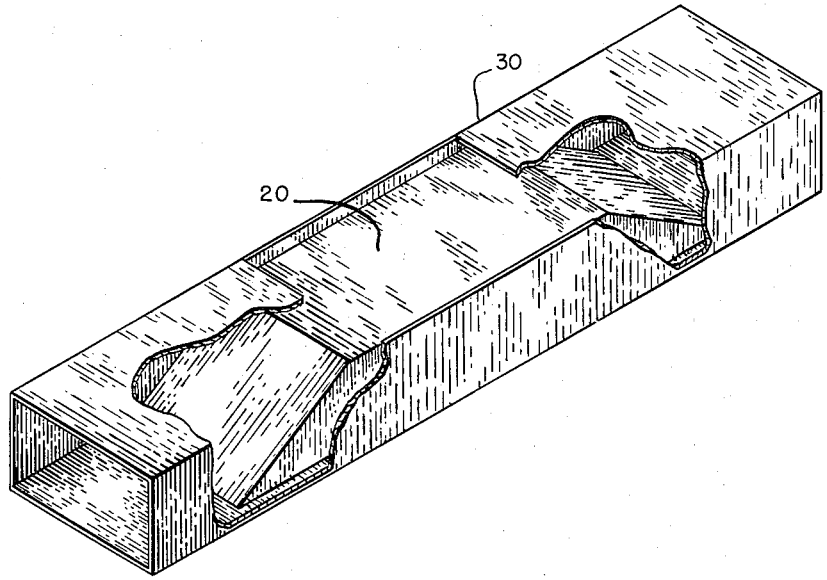

For a better understanding of the present invention, together with other and further objects thereof, reference is had to the following description taken in connection with the accompanying drawing in which:

Fig. 1 is a perspective view, partially cut away, of one embodiment of my invention; and Fig. 2 is a perspective view of a second embodiment of my invention.

Referring now to Fig. 1 of the drawing, there are shown two discrete metallic sections 10 and 12 of a conventional rectangular waveguide. Millimeter waves of a frequency which may be efficiently transmitted by the waveguide sections 10 and 12 are introduced into the guide at end 14. Intermediate waveguide sections 10 and 12 is a guide section 16, made of fused quartz, teflon or any other suitable dielectric material, which is so dimensioned that the fields propagated therein have the same configuration as the field propagated within said metal waveguide sections. A conventional type wave detector probe 18 is slideably mounted on a rod 19 to centrally position probe 18 on surface 20 of dielectric guide section 16 and to permit longitudinal movement of said probe along said surface. The ends of dielectric section 16 may be tapered as shown at 22 and 24 to provide suitable matching terminations. It is to be understood of course that other suitable methods for matching dielectric section 16 to the metallic waveguides may be utilized. It is well known that if the dimensions of the dielectric guide are correctly chosen, no serious radiation will occur if no metal boundaries are provided therefor. The standing waves detected by probe 18 are applied to an indicator 26 through a suitable transmission line 28.

If desired, only one surface of dielectric section 16 may be exposed. As shown in Fig. 2, metallic waveguide 30 has a portion of one surface removed so that only surface 20 of dielectric section 16 is exposed. The remaining surfaces of the dielectric section are bounded by the metallic walls of waveguide 30 so that effectively waveguide 30 comprises one continuous waveguide. While the depth of penetration is maintained constant on exposed surface 20, a very shallow longitudinal centrally disposed groove may be provided in said exposed surface to maintain constant the lateral spacing of the probe 18.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A standing wave detector for the field within a waveguide adapted to propagate radio energy of millimeter wavelengths comprising a solid dielectric section intermediate two discrete sections of said waveguide, said dielectric section being so dimensioned that the fields propagated therein have the same configuration as the fields propagated within said waveguide, means at the ends of said dielectric section for matching said dielectric section to said discrete waveguide sections, a wave probe orthogonally positioned with respect to a preselected surface of said dielectric section, and means for axially positioning said probe along one surface of said dielectric section to derive at said probe voltage maxima and minima in said waveguide.

2. A standing wave detector for the field within a rectangular waveguide adapted to propagate radio energy of millimeter wavelengths comprising, a solid dielectric section longitudinally disposed intermediate two discrete sections of said waveguide, said dielectric sections being so dimensioned that the fields propagated therein have the same configuration as the fields propagated within said waveguide, means at the ends of said dielectric section for matching said dielectric section to said discrete waveguide sections, a wave probe orthogonally positioned with respect to a longitudinal surface of said dielectric section, and means for positioning said probe longitudinally along one surface of said dielectric section to derive at said probe voltage maxima and minima in said waveguide.

3. A standing wave detector for the field within a rectangular waveguide having a narrow dimension and a wide dimension and adapted to propagate radio energy of millimeter wavelengths, comprising, a rectangular solid dielectric section longitudinally disposed intermediate two discrete sections of said waveguide, said dielectric section having its wide dimension coextensive with the wide dimension of said waveguide sections and having at least one longitudinal surface exposed, means at the ends of said dielectric section for matching said dielectric section to said discrete waveguide sections, a wave probe orthogonally positioned with respect to said exposed dielectric surface, and means for positioning said probe longitudinally along said wide surface to derive at said probe voltage maxima and minima in said waveguide.

References Cited in the file of this patent

UNITED STATES PATENTS

| 2,129,711 | Southworth | Sept. 13, 1938 |
| 2,454,530 | Tiley | Nov. 23, 1948 |
| 2,496,837 | Woodyard | Feb. 7, 1950 |
| 2,532,317 | Lundstrom | Dec. 5, 1950 |
| 2,617,880 | Iams | Nov. 11, 1952 |